Nov. 10, 1959 D. ROBINSON ET AL 2,912,678

METHOD AND APPARATUS FOR MECHANICALLY STORING ELECTRICAL INFORMATION

Filed Nov. 26, 1954 2 Sheets-Sheet 1

Inventors:
David Robinson,
Edward E. Mitchell,
Theodore T. Johnson,
Richard W. Samsel,
by Merton D. Moore
Their Attorney.

Inventors:
David Robinson,
Edward E. Mitchell,
Theodore T. Johnson,
Richard W. Samsel,
by Merton D. Moore
Their Attorney.

United States Patent Office 2,912,678
Patented Nov. 10, 1959

2,912,678

METHOD AND APPARATUS FOR MECHANICALLY STORING ELECTRICAL INFORMATION

David Robinson, Alplaus, Edward E. Mitchell, Utica, Theodore T. Johnson, Schenectady, and Richard W. Samsel, Scotia, N.Y., assignors to General Electric Company, a corporation of New York Application November 26, 1954, Serial No. 471,209

14 Claims. (Cl. 340—174)

This invention relates to a method and apparatus for mechanically storing electrical information, and more particularly to such a method and apparatus as will store the information in the form of closed or open switch contacts.

In many control or computing applications, it is frequently desired to store, temporarily, bits of information, often in the form of the presence or absence of electrical pulses, during the time when other operations, such as checking, are occurring. Following this intermediate storage time, it is then often desired to place this information into storage in the form of closed or open contacts. The methods and equipment presently used in the art to accomplish the above-noted results are expensive, bulky, and complex; and the present invention is designed to overcome all of these disadvantages.

It is, therefore, one object of this invention to provide a method and apparatus which will simply and economically, mechanically store electrical information.

It is another object of this invention to provide a method and apparatus which will simply and economically store electrical information in the form of closed or open switch contacts.

It is a further object of this invention to provide switches suitable for use with the method and apparatus of the invention.

Other objects and advantages will appear as the description of the invention proceeds.

In accordance with the invention, a method is disclosed which includes the steps of temporarily magnetically recording electrical information, and then bringing the magnetically recorded information into juxtaposition with a mechanical switch element, the magnetic field of the temporarily stored information directly acting upon the switch element and causing it to store the information in the form of a closed or open contact. The apparatus embodying the invention comprises a record element for magnetically storing information received thereby, and at least one mechanical switch which may be operated by the magnetically stored information when opposite thereto.

The features of this invention which are believed to be novel and patentable are pointed out in the claims which form a part of this specification. For a better understanding of the invention, reference is made in the following description to the accompanying drawings, wherein like parts are indicated by like reference numerals, in which:

Figure 1:
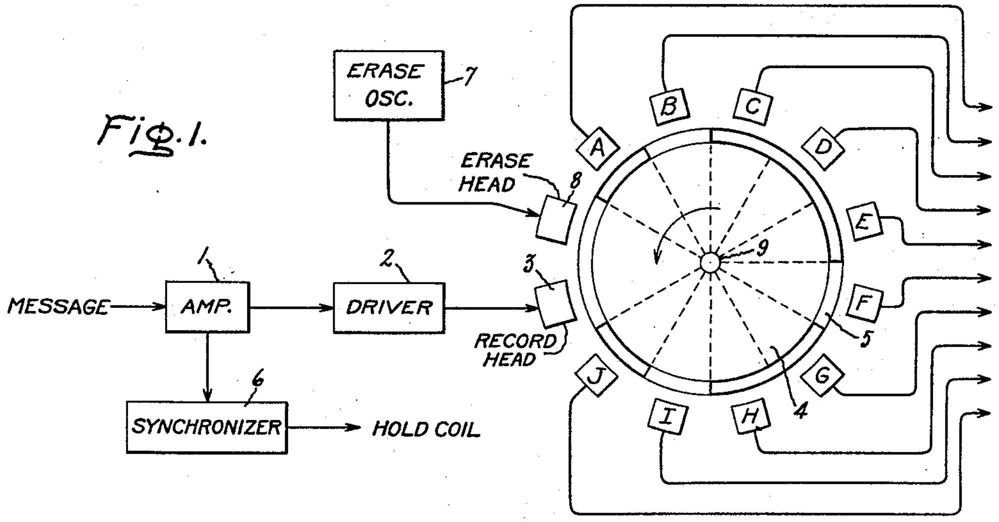
Fig. 1 is a block diagram of one embodiment of the invention.

Referring now to Fig. 1, there is shown by way of example a specific embodiment embodying a novel apparatus that can be used to practice the novel method of the invention. The particular embodiment in this figure is a decoder which may move one or more of ten switch contacts in accordance with the receipt or non-receipt of an input signal. In this figure, the titled blocks represent, in their broadest form, apparatus for impressing an electrical signal upon a magnetic element; the ring or disc represents an element for magnetically storing the electrical information impressed thereupon; and the lettered blocks represent, in their broadest form, switches whose contacts are either opened or closed directly by the magnetically stored information.

In the particular embodiment of the invention illustrated in Fig. 1, it is desired mechanically to store a coded message containing ten bits of information. As indicated on this figure, this message is fed into an amplifier 1 whose output is fed into a driver 2. The output from the driver 2 is conducted to a record head 3, this record head serving to impress magnetically the input message upon any magnetic material placed adjacent thereto. In this embodiment of the invention, the magnetic element upon which it is desired to impress the pulses of information is a disc 4 having a rim 5 made of a magnetic material such as Alnico. Since it is desired mechanically to store ten bits of information, ten magnetic switches labelled A–J are disposed around the circumference of rim 5, each of these magnetic switches having output leads coming therefrom as shown in this figure. These switches may be of the multiposition switch types illustrated in Figs. 2 and 3, and they will be more fully described in connection with these figures.

Figure 2:
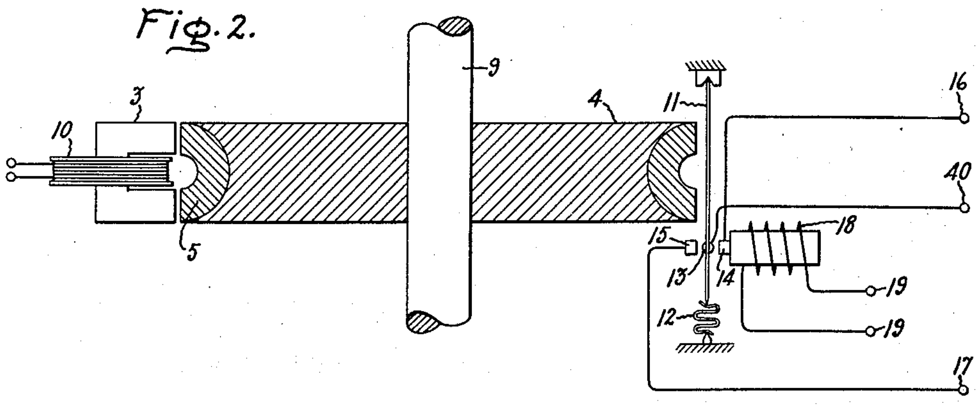
Fig. 2 is a view, partially in cross section, showing one embodiment of some of the elements of Fig. 1 in detail.
Figures 3, 4, 5:
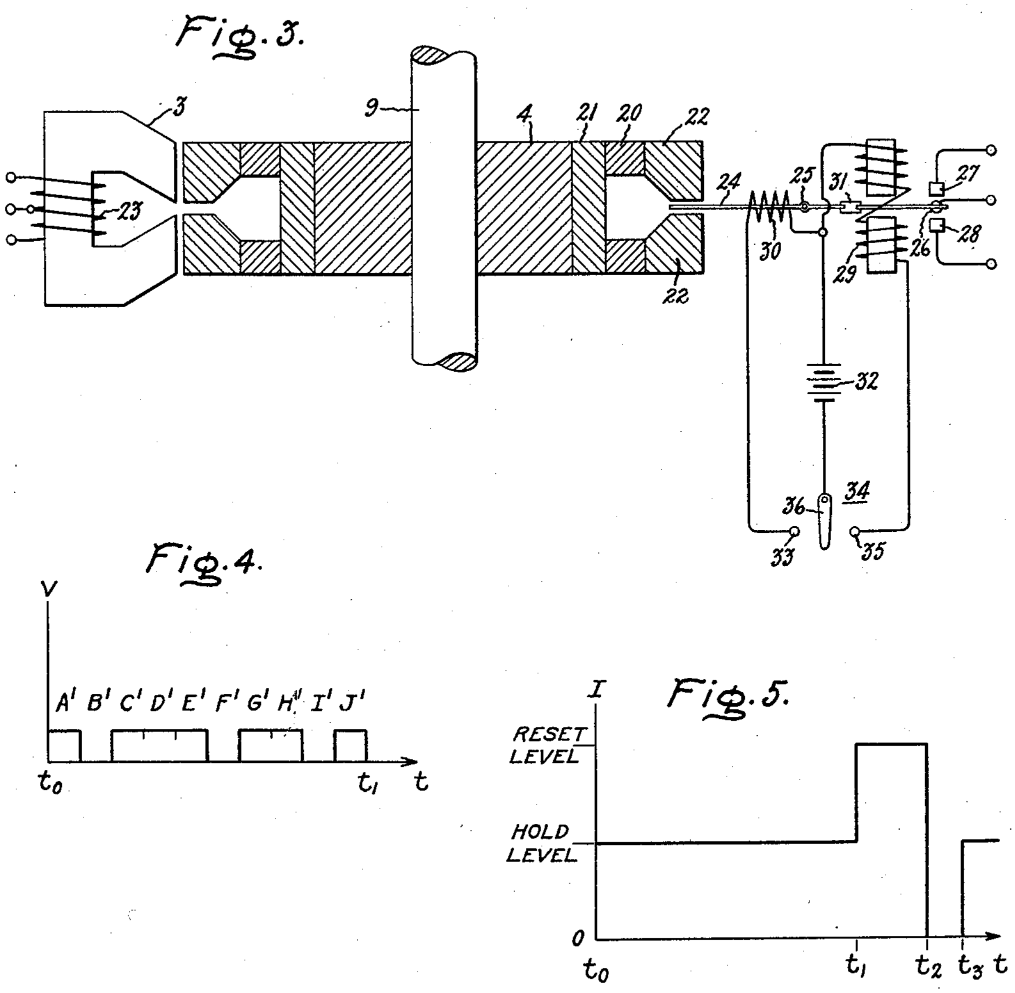
Fig. 3 is a view, partially in cross section, showing another embodiment of some of the elements of Fig. 1 in detail.
Fig. 4 is a plot of voltage against time and shows an example of the kind of electrical information which it might be desired to record.
Fig. 5 is a plot of current against time showing a waveform which might be applied to the switch of Fig. 2.

In order to maintain these switches in their positions until it is desired to record the input message mechanically, a synchronizer 6, which in this embodiment is receptive of the output from amplifier 1, goes to a hold coil or coils coupled to the magnetic switches, the hold coils being illustrated in Figs. 2 and 3.

A suitable synchronizer circuit is shown in Fig. 3 and will be further explained in connection with this figure.

Disc 4 is mounted upon a shaft 9 and rotates in a counterclockwise manner past head 3 and an erase head 8. Erase head 8 is used to erase the magnetic signal impressed upon rim 5 after the signal has been mechanically stored, and the output of an erase oscillator 7 is fed into head 8, which head is positioned adjacent to rim 5. Amplifier 1, driver 2, heads 3 and 8, and oscillator 7 are all well known in the art, and it is believed that no further explanation of these elements is necessary.

Now will be described the operation of the apparatus of Fig. 1. Referring for the moment to Fig. 4, there is shown, by way of example, an input message occupying ten discrete intervals of time from $t_0$ to $t_1$ and respectively labelled A′ to J′. During intervals B′, F′, and I′, no pulse is received; whereas during the other intervals, a positive voltage pulse is received. The receipt or non-receipt of a pulse both constitute bits of information which it is desired to store mechanically. Referring now to Fig. 1, it will be seen that the positive voltage pulses are amplified in amplifier 1, fed to driver 2, and then transmitted to record head 3. Taking interval A′, for example, record head 3 will magnetize the circumference of rim 5 of disc 4, to the extent indicated in the heavily outlined portion of rim 5 under switch A, when this portion of the rim passes adjacent to record head 3 at the time when a pulse comes in. During interval B', nothing will be impressed upon rim 5, as shown in Fig. 1 by the fact that no heavily outlined portion exists on rim 5 under switch B. The results outlined above with respect to time interval A' are repeated for time intervals C', D', E', G', H', and J'. Also, the results outlined above with respect to time interval B' are repeated for time intervals F' and I'. All of these bits of information are impressed upon the rim 5 of disc 4 as the disc rotates past record head 3, switches A–J being held in their positions by the hold coil and the synchronizer. When all of the information bits during time intervals A'–J' have been impressed upon rim 5, and when these bits are under their corresponding switches A–J, the hold coil and the synchronizer may permit the magnetically impressed information bits to move their corresponding switches to new contact positions, if the nature of each bit demands it. In the example given, the switches corresponding to time intervals A', C', D', E', G', H' and J' may be moved to new contact positions, switches B, F and I being unaffected. The synchronizer and hold coils then hold the switch contacts in their positions, while disc 4 continues to rotate, thus preventing the switches from being affected by non-corresponding magnetic pulses. The rotation of disc 4 then passes all of the magnetically stored information under erase head 8 so that this information is removed, and the apparatus is now ready to receive new information. It will be apparent that the receipt or non-receipt of pulses may operate the switches, and that the movement or lack of movement of the various switch contacts of switches A–J can be made to activate an electrical circuit in a manner well known to the art so as to indicate the information received.

Referring now to Fig. 2, there is shown a cross-sectional view of disc 4, with shaft 9 passing therethrough. Around the circumference of disc 4 is shown a slotted rim of permanent magnetic material, such as Alnico, this rim being labelled 5 and corresponding to rim 5 of Fig. 1. Adjacent to rim 5 is shown a head 3 corresponding to record head 3 of Fig. 1, although it could also be erase head 8. This head is shown as including a coil 10 upon which the output from driver 2 of Fig. 1 may impress a signal to magnetize rim 5.

Also adjacent to rim 5, shown by way of example, is one type of switch which could be used for one of the switches A–J of Fig. 1, and comprising a mechanically multistable reed 11, made of a magnetic material, such as soft iron, pivoted at its top end and pivotally connected to a compression spring 12 at its bottom end. In this example, spring 12 causes reed 11 to be bistable and remain in position when moved to the left or right. This reed carries a contact element 13 and is disposed between a pair of contacts 14 and 15. Contact 14 is connected to an output terminal 16, contact 15 is connected to an output terminal 17, and contact element 13 is connected to an output terminal 40. A hold coil assembly 18 is provided, upon which is mounted contact 14, this coil having a pair of terminals 19—19 into which the output from synchronizer 6 of Fig. 1 is fed.

Referring now to Fig. 5 as well as Fig. 2, the operation of the switch of Fig. 2 will now be explained. In Fig. 5 is shown a plot of the current to be applied to hold coil 18. This current, during the time from $t_0$, when the first bit of information arrives, to the time $t_1$, when the last bit of information has come in, is sufficient to maintain contact element 13 of reed 11 against contact 14, despite any magnetic information on rim 5; whereas, if contact element 13 is against contact 15, the hold coil current is insufficient to move the reed, and any magnetic information on rim 5 will not disturb the reed in this position. From $t_0$ to $t_1$ the bits of information are therefore being magnetically impressed upon rim 5 without disturbing any of the switches.

Then for an interval from $t_1$ to $t_2$, a large current impulse is applied to the hold coil 18 to wipe off the old permanently stored message by moving the contact element 13 of reed 11 against contact 14 regardless of its previous position. Then, for the time interval from $t_2$ to $t_3$, no current is applied to the hold coil and the reed is free to assume a new contact position, as determined by the magnetically stored information bit opposite the switch. After time $t_3$, the hold current is again applied, this hold current, as before, being insufficient to move the reed from its contact position but being enough to prevent it from being moved by information magnetically stored on the rotating disc 5. The above operation is then repeated for the next series of information bits, for each of the switches. The closing of contact 13 with either contact 14 or contact 15 is used to provide an indication of the receipt or non-receipt of an electrical pulse, in a manner well known to the art. For example, lights and batteries might be placed across terminals 17—40 and 16—40, the touching of contact element 13 against contact 14 or 15 serving to complete the circuit and light a light.

Figure 6:
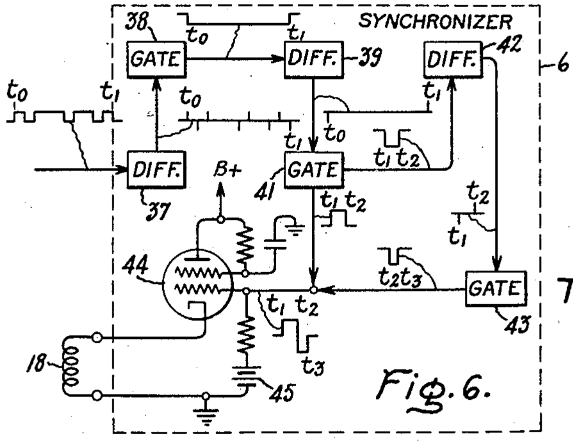
Fig. 6 is a block and schematic diagram, showing a circuit for deriving the waveform of Fig. 5.

In Fig. 6 is illustrated a synchronizer circuit 6 suitable for use as a synchronizer in Fig. 1 and producing the waveform shown in Fig. 5 for application to the hold coil 18 of Fig. 2. The input signal shown in Fig. 4, and occupying a time from $t_0$ to $t_1$, is fed into a differentiating circuit 37, as shown. This differentiating circuit may comprise an ordinary resistor-capacitor network for differentiating pulses fed thereto, such circuits being well known to the art. The output from circuit 37 includes a pulse at $t_0$ which is fed into a gate circuit 38 for producing a square wave beginning at $t_0$ and ending at $t_1$. Gate 38 may comprise an ordinary multivibrator circuit having circuit constants that will cause it to produce a square wave of a duration from $t_0$ to $t_1$ when triggered by the first pulse at $t_0$, and it is not affected by other pulses from circuit 37. Such gate multivibrator circuits are well known in the art and are therefore not illustrated in detail here.

The square wave output from gate 38 is fed into a differentiating network 39 that is similar to that of circuit 37, in order to provide a pulse at a time $t_1$. This pulse at time $t_1$ is fed into a gate multivibrator circuit 41, and serves to trigger this gate circuit. Gate circuit 41 may comprise the usual multivibrator that is well known to the art for producing positive and negative square waves, as shown, and the constants of this circuit are chosen so that the square wave output has a duration from the time $t_1$ to the time $t_2$. The last named time interval is so chosen that the disc 4 of Fig. 1 has time to move the record head 3 to a position such that the magnetized portions on its circumference are under their respective switches.

A negative output square wave from gate 41 is fed into a differentiating network 42 in order to produce a pulse at the time $t_2$, differentiating circuit 42 being similar to circuits 37 and 39. The pulse at time $t_2$ derived from differentiating circuit 42 is fed into a gate multivibrator 43 in order to produce a negative square wave having a duration from the time $t_2$ to a time $t_3$. Multivibrator 43 is similar to gate multivibrators 38 and 41, and it has circuit constants such that a square wave of the proper duration is produced, this square wave representing a time sufficient to enable the magnetically stored bits of information on rim 5 of disc 4 in Fig. 1 to operate only their respective switches A–J.

The positive square wave from $t_1$ to $t_2$ from gate 41 is mixed with the negative square wave from $t_2$ to $t_3$ from gate 43, as indicated in Fig. 6, and the composite waveform having the shape of the waveform shown in Fig. 5 is applied to the control grid of a mixer tube 44. Mixer tube 44 is biased by a battery 45 at a level such that current continuously passes through hold coil 18 in its cathode circuit, this hold coil being the one shown in Fig. 2. The positive pulse from $t_1$ to $t_2$ at the control grid of mixer 44 causes a large current to flow through the hold coil and serves to reset the switches, whereas the negative pulse from $t_2$–$t_3$ turns the mixer off entirely and allows the magnetically stored information to operate the various switches by moving or not moving their contacts.

Referring now to Fig. 3, another embodiment of a multiposition, multistable switch suitable for use as one of the switches in Fig. 1 is shown. In this figure, disc 4 again is shown in cross-section and has shaft 9 passing through its center. Now however, the circumference of disc 4 comprises a permanent magnet 20 having a magnetic element 21 and pole pieces 22 on either side thereof to concentrate the magnetic flux. Recording head 3 is now shown as having a winding 23 with a center tap, so that the two pole pieces 22 may be made to assume either a north-south or a south-north polarity.

A reed 24 is provided and passes between the pair of pole pieces 22, this reed being free to pivot about a point 25. Reed 24 has a contact element 26 at one end thereof, this contact element being disposed between a pair of contacts 27 and 28, elements 26, 27 and 28 having leads and output terminals connected thereto as in Fig. 2, the terminal from element 26 being common to the terminals from elements 27 and 28. Reed 24 also passes within a hold coil assembly 29 near its one end, and within a coil 30 near its other end, the reed being split between these coils and held together by an element 31 made of a nonferromagnetic material such as a ceramic, which element provides a magnetic insulating gap between coils 29 and 30.

One end of coil 30 goes to the top of a battery 32, while the other end goes to a terminal 33 of a switch 34, switch 34 serving as a synchronizer for the switch of this figure and replacing synchronizer 6 of Fig. 1. One end of coil 29 also goes to the top of battery 32, while the other end goes to a terminal 35 of switch 34. A movable switch contact arm 36 serves to connect the battery 32 in series with either coil 29 or coil 30. It should be understood that an electronic switch, such as a multivibrator, could be used in place of manual switch 34, as is well known in the art.

Now will be described the operation of the switch embodied in Fig. 3. Switch arm 36 is first thrown against contact 35, either manually or electrically as in Fig. 2, at the beginning of the incoming message. Coil 29 then serves to hold reed 24 either up at contact 27 or down at contact 28, depending upon the position of the reed, making this switch bistable. After all of the information is impressed upon element 20 by the recording head, which information imparts a magnetic polarity to the top one of pole pieces 22 that is opposite from that imparted to the bottom one of these pole pieces, switch arm 36 is thrown against contact 33. Once again switch 34 may be moved either manually or electrically in synchronism with the incoming message as in Fig. 2. The movement of switch arm 36 from contact 35 to contact 33 when the message is completely stored on disc 4, serves to disconnect the hold coil 29 from the battery 32 and leaves reed 24 free to move. Also, coil 30 is activated by this movement and it serves to magnetize reed 24, the magnetic force thus developed being added to the magnetic force from pole pieces 22 and serving to maintain reed 24 at its old position or else move it to a new position, depending upon both its old position and the polarity of pole pieces 22. Contact 26 on reed 24 thus touches either contact 27 or 28, closing the circuit and providing an indication on contacts 26—27 or 26—28 of the presence or absence of an input pulse as well as the polarity of any such pulse. Contacts 27 and 28 also serve as stops to prevent reed 24 from touching pole pieces 22.

This switch, in addition to being able to distinguish between input signals of differing polarities has further advantages over the switch of Fig. 2 in that the reed of the Fig. 3 switch will respond to lower magnitude recorded magnetic information since no pivot spring 12 is needed to make the switch multistable, and in that no reset pulse need be applied to hold coil 29.

The method and apparatus of Figs. 1–6 can be of value in saving of space and equipment in such uses as mathematical and business computers, industrial control and automation processes, communications, and military control and guidance equipment. Further, the basic idea of magnetically recording information and later using the recording to close contacts directly, may be applied to many other fields where complex or repetitive, simultaneous or sequential switching is required.

It should be understood that the desired system for utilizing this method of data handling may be made in endless variety by varying the number and placement of the switch contacts, record heads, and erase heads. Also, the shape of the hold waveform may be varied. Moreover, the record disc may be continuously or intermittently rotating, at constant or varying speed; and with constant speed rotation, the drive shaft may be used to provide synchronizing signals or constant frequency signals for other uses. The switching operations may be performed with the disc rotating or stopped, and erasure may be continuous or as determined by some external means. Further, the rotating magnetized disc may be separated from the switches and only brought adjacent thereto when the operator is ready to permanently store the information.

Several information channels may be employed on a single disc, and/or multiple discs may be used. Subsidiary magnetic recordings, differing in frequency, time, or spacing may be used on the same disc for other operations such as checking, timing, and programming; and while these other recordings may be made on the same disc, they need not be of such nature as to close a contact, but may be of the sort used in usual magnetic tape recording.

The moving element may be mechanically, electrically or magnetically multistable; however, the multistable feature may be done away with entirely, in some arrangements. Also, the element may be magnetized permanently or temporarily to enhance forces or actions, and the recorded information may be unipolar or bipolar. Switching may be single or multiple pole, single or multiple throw.

The magnetic actuating or hold force may be applied in a number of ways such as by application to the toggle of a two-piece mechanically multistable element. Also, a single hold coil may be common to all of the switches. Moreover, the hold operation may be done by such means as mechanical latches or hooks, or by gravity; or a coil type of pickup may be used to actuate a holding relay element, the coil being separated from the disc. Further, the contact elements may be distributed diametrically, circumferentially, axially, or linearly, to fit any given application.

The record material may be in the form of a disc, drum, cylinder, or line; and the magnetic material of which its rim is made may be designed to produce specific magnetic forms and field intensities so as to increase the actuating force on a small reed by concentrating the magnetic flux. Also, either attractive or repulsive magnetic forces may be exerted upon the switch reeds, depending upon the polarity of the reed and/or the polarity of the magnetically recorded information. Further, the reeds themselves may or may not be magnetized.

While there has been described what are presently considered preferred embodiments of the invention, it will be obvious to those skilled in the art that various changes and modifications may be made therein without departing from this invention; and it is aimed in the appended claims to cover all such changes and modifications as fall within the true spirit and scope of the invention.

What we claim as new and desire to secure by Letters Patent of the United States is:

1. Magnetic control apparatus comprising, record means for magnetically storing information received thereby, at least one multiposition mechanical switch means directly operated by the information magnetically stored in said record means when adjacent thereto and mechanically storing by its switch positions the magnetically stored information, and synchronizing means including coil means for preventing the operation of said switch means while the information is being stored in said record means and until the information magnetically stored in said record means is adjacent to said switch means.

2. Magnetic control apparatus comprising, movable record means for magnetically storing a plurality of bits of information received thereby, and a plurality of mechanical switch means adjacent said record means and respectively corresponding to the respective bits of information, said plurality of switch means being directly operated by and mechanically storing their corresponding bits of information when said record means moves to a position such that said plurality of switch means are respectively adjacent to their corresponding magnetically stored bits of information and synchronizing means including coil means for preventing the operation of said switch means while said plurality of bits of information are being stored thereon.

3. Magnetic control apparatus comprising, movable record means for magnetically storing a plurality of bits of information received thereby, and a plurality of multiposition mechanical switch means adjacent said record means and respectively corresponding to the respective bits of information, and synchronizing means including coil means for preventing operation of said plurality of switch means while said bits of information are being stored on said movable record means and to cause said switch means to be directly operated by and store by their switch positions their corresponding bits of information when said record means moves to a position such that said plurality of switch means are respectively adjacent to their corresponding magnetically stored bits of information.

4. Magnetic control apparatus comprising, movable record means for magnetically storing a plurality of bits of information received thereby, a plurality of multiposition mechanical switch means adjacent said recording means and respectively corresponding to the respective bits of information stored therein, and synchronizing means including coil means for holding said mechanical switch means in their initial position so that they will not be operated by bits of information on said movable record means and for causing said plurality of switch means to be directly operated by and store by their switch positions their corresponding bits of information magnetically stored in said record means when said record means move to a position such that said plurality of switch means are respectively adjacent to their corresponding magnetically stored bits of information.

5. Magnetic control apparatus comprising, record means for magnetically storing information received thereby, and at least one multiposition mechanical switch means directly operated by the information magnetically stored in said record means when adjacent thereto, said switch means comprising a mechanically multistable reed made of magnetic material and disposed near a plurality of fixed contacts, said reed being moved to one of its plurality of fixed contacts by said information and synchronizing means including coil means to prevent movement of said reed while information is being stored on said record means.

6. Magnetic control apparatus comprising, record means for magnetically storing information received thereby, at least one multiposition mechanical switch means directly operated by the information magnetically stored in said record means when adjacent thereto, said switch means comprising a mechanically multistable reed made of magnetic material and disposed near a plurality of fixed contacts, said reed being moved to one of its plurality of fixed contacts by said information, and synchronizing means including coil means for holding said reed in position while information is being magnetically stored in said record means.

7. Magnetic control apparatus comprising, record means for magnetically storing information received thereby, at least one multiposition mechanical switch means directly operated by the information magnetically stored in said record means when adjacent thereto, said switch means comprising a mechanically multistable reed made of magnetic material and disposed near a plurality of fixed contacts, said reed being moved to one of its fixed contacts by said information, synchronizing means including coil means for holding said reed in the position determined by the last bit of information magnetically stored in said record means while information is being stored in said record means and for magnetizing said reed when said switch means is adjacent to the magnetically stored information whereby said reed is moved to a reference position and prepared for operation by the magnetically stored information.

8. Magnetic control apparatus comprising, rotatable record means for magnetically storing information received thereby, means for applying a plurality of bits of information to said record means for separately magnetically storing said bits of information around the circumference of said rotatable record means, a plurality of multiposition mechanical switch means disposed around and near the circumference of said recording means and respectively spaced in a manner corresponding to the spacing of the bits of information stored around the circumference of said record means, each of said switch means being directly operated by and indicating by its switch position a corresponding bit of information magnetically stored in said record means when said record means rotates to a position such that said plurality of switch means are respectively adjacent to their corresponding magnetically stored bits of information and synchronizing means including coil means to prevent movement of said reed while information is being stored on said record means.

9. Magnetic control apparatus comprising, rotatable record means for magnetically storing information received thereby, means for applying a plurality of bits of information to said record means to magnetize respective portions thereof in response to each of said bits of information, a plurality of multiposition mechanical switch means respectively corresponding to the bits of information stored on said record means, each of said switch means being directly operated by and indicating by its switch position a corresponding bit of information magnetically stored in said record means when said record means rotates to a position such that said plurality of switch means are respectively adjacent to their corresponding magnetically stored bits of information, and synchronizing means including coil means for holding said plurality of switch means in their positions until said plurality of bits of information have been magnetically recorded.

10. Magnetic control apparatus comprising, rotatable record means for magnetically storing information received thereby, means for applying a plurality of bits of information to said record means to magnetize respective portions thereof in response to each of said bits of information, a plurality of multiposition mechanical switch means respectively corresponding to the bits of information stored on said record means, each of said switch means being directly operated by and indicating by its switch position a corresponding bit of information magnetically stored in said record means, each of said plurality of switch means respectively comprising a mechanically bistable reed made of magnetic material and disposed between a pair of fixed contacts and each of said reeds assuming a position touching a fixed contact in accordance with its corresponding bit of information, and synchronizing means including coil means for holding said reeds against the fixed contacts determined by the last bit of information until said plurality of bits of information have been applied to said record means.

11. Magnetic control apparatus comprising, rotatable record means for magnetically storing information received thereby, means for applying a plurality of bits of information to said record means to magnetize respective portions thereof in response to each of said bits of information, a plurality of two position switch means directly operated by and indicating by its switch position a corresponding bit of information magnetically stored in said record means, each of said plurality of switch means respectively comprising a bistable reed made of magnetic material and disposed between a pair of fixed contacts, each reed indicating by its position against its fixed contacts its corresponding bit of information, synchronizing means including coil means for holding said reeds against their fixed contacts until their corresponding bits of information have been magnetically stored in said record means and for magnetizing said reed when said switch means are adjacent their corresponding magnetically stored bits of information whereby said bistable reeds are moved against a reference one of said pair of fixed contacts and prepared for operation by said magnetically stored bits of information.

12. A mechanical switch adapted to be directly operated by and to indicate by its switch position a bit of magnetically stored information, comprising a reed made of magnetic material and disposed near a plurality of fixed contacts, said reed being directly switched to assume a position touching one of its fixed contacts when adjacent to a magnetically stored bit of information, and synchronizing means including coil means for holding said reed in position when a bit of magnetically stored information is adjacent to said reed and unit it is desired to record the magnetically stored information.

13. A mechanical switch adapted to be directly operated by and to indicate by its switch position a bit of magnetically stored information, comprising a reed made of magnetic material and disposed near a plurality of fixed contacts, said reed being directly switched to assume a position touching one of its fixed contacts when adjacent to a magnetically stored bit of information, pivot spring means for making said reed mechanically multistable, and synchronizing means including coil means for holding said reed in an initial position when a bit of magnetically stored information is adjacent to said reed and until it is desired to record the magnetically stored information.

14. A mechanical switch adapted to be directly operated by and to indicate by its switch position a bit of magnetically stored information, comprising a reed made of magnetic material and disposed near a plurality of fixed contacts, said reed being directly switched to assume a position touching one of its fixed contacts when adjacent to a magnetically stored bit of information, and synchronizing means including coil means for holding said reed in position when a bit of magnetically stored information is adjacent to said reed and until it is desired to mechanically record the magnetically stored information and for magnetizing said reed when said switch means is adjacent to the magnetically stored information whereby said reed is moved to a reference position and prepared for operation by the magnetically stored information.

References Cited in the file of this patent

UNITED STATES PATENTS

| | | |
|---|---|---|
| 2,303,918 | Dimond | Dec. 1, 1942 |
| 2,770,796 | Boer | Nov. 13, 1956 |